US008254373B2

(12) United States Patent
Kucmerowski et al.

(10) Patent No.: US 8,254,373 B2
(45) Date of Patent: Aug. 28, 2012

(54) METHOD OF CONDUCTING SECURE TRANSACTIONS OVER A TELECOMMUNICATIONS SYSTEM AND SESSION INITIATION PROTOCOL (SIP) BASED INPUT ECHO DISPLAY CONTROL FOR CONDUCTING SECURE TRANSACTIONS

(75) Inventors: Dennis Kucmerowski, Delray Beach, FL (US); Mallikarjuna Samayamantry Rao, Delray Beach, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1336 days.

(21) Appl. No.: 11/981,403

(22) Filed: Oct. 31, 2007

(65) Prior Publication Data

US 2009/0110160 A1    Apr. 30, 2009

(51) Int. Cl.
*H04L 12/66* (2006.01)
*H04M 11/00* (2006.01)
*G06Q 40/00* (2012.01)

(52) U.S. Cl. .................. 370/352; 379/93.03; 379/93.12; 705/39; 705/44

(58) Field of Classification Search ........................ None
See application file for complete search history.

(56) References Cited

U.S. PATENT DOCUMENTS

| 2005/0105713 | A1* | 5/2005 | Carlson et al. ................. 379/350 |
| 2005/0238174 | A1* | 10/2005 | Kreitzer ......................... 380/277 |
| 2006/0020798 | A1* | 1/2006 | Lai et al. ........................ 713/170 |
| 2006/0176805 | A1* | 8/2006 | Peters ............................ 370/228 |
| 2007/0064682 | A1* | 3/2007 | Adams et al. ................. 370/352 |
| 2007/0281682 | A1* | 12/2007 | Raju et al. ................. 455/422.1 |
| 2007/0288600 | A1* | 12/2007 | Arabi et al. ................... 709/219 |
| 2008/0037752 | A1* | 2/2008 | Chatilov et al. .......... 379/202.01 |

* cited by examiner

*Primary Examiner* — Gary Mui
*Assistant Examiner* — Hicham Foud

(57) ABSTRACT

A method of managing a communications network, managing secure transactions conducted by digital communications devices over a communications network and computer program product therefore. A Back to Back User Agent (B2BUA), for example, receives numerical input from a networked digital communications device, e.g., a Session Initiation Protocol (SIP) device, and determines when and whether the SIP device displays digits entered at the devices. The B2BUA analyzes received digits for an identification (ID) code and selectively couples the SIP devices with a media server capable of prompting the SIP devices. In cooperation with the media server, the B2BUA directs replacing sensitive codes (e.g., passwords or Personal Identification Number (PIN)) with placekeepers or suppressing display altogether. After sensitive code input is complete, digit entry display resumes.

20 Claims, 2 Drawing Sheets

METHOD OF CONDUCTING SECURE TRANSACTIONS OVER A TELECOMMUNICATIONS SYSTEM AND SESSION INITIATION PROTOCOL (SIP) BASED INPUT ECHO DISPLAY CONTROL FOR CONDUCTING SECURE TRANSACTIONS

BACKGROUND OF THE INVENTION

1. Field of the Invention

The present invention is related to digital telecommunications systems and more particularly, to Session Initiation Protocol (SIP) based telecommunications networks and conducting secure transactions with SIP based telecommunications devices.

2. Background Description

Commercial telecommunications platforms have allowed service providers to deliver Internet Protocol (IP) based telecommunications services. Typical such IP telecommunications services feature common channel telecommunications packet switching capabilities, such as Signaling System Number 7 (SS7) signaling capabilities. These capabilities allow for legacy feature support and, further, interconnection with Public Switched Telephone Networks (PSTN). Digital communications such as Voice over IP (VoIP), for example, normally use Session Initiation Protocol (SIP) for establishing and clearing connections between network stations at SIP endpoints. Since SIP communications are digital, packet based communications, almost any wired or wireless digital device may be connected as SIP endpoint.

Typical SIP endpoints include digital devices such as, for example, digital keysets or telephones, digital soft phones, e.g., a computer terminal operating as a digital phone. A basic SIP device has a keypad and a display that conveniently displays what is entered on the keypad. Generally, the SIP endpoint does not have a capability of determining when to and when not to echo/display input numerical digits. Consequently, SIP communication protocol does not currently have a communication protocol mechanism to transport control display information from a proxy or application to a SIP endpoint for support features that may be necessary, for example, for conducting secure transactions.

Instead, once a SIP device at a SIP endpoint is connected (i.e., in a connect state) with a proxy server or a media server, the SIP device either always echoes input digits (i.e., whatever is input on the keypad are either displayed on the device display) or, cannot be displayed at all. Previously, the connected server could not prevent the display or otherwise indicate to the SIP endpoint not to echo any of the numbers. When the input is an authorization code, password or other sensitive private information, for example, the entered digits may be displayed for anyone to view. When viewed by the wrong individual, this private information may be stolen and used to the detriment of its owner. Otherwise, when other inputs, such as an identification (ID) code, a destination or product order number, are being input, it may be to the endpoint user's benefit to see what is being input as it is entered.

Thus, there is a need for a SIP communication protocol mechanism to transport control display information from a proxy or application to a SIP endpoint. More particularly, there is a need within SIP based communication between SIP server(s) and SIP endpoints for a SIP server capability or application to indicate to SIP entities, e.g., SIP end points, whether or not to echo input digits and, moreover whether to substitute placekeeper digits when input digits are not echoed.

SUMMARY OF THE INVENTION

It is a purpose of the invention to automatically, selectively suppress echoing Session Initiation Protocol (SIP) endpoint inputs;

It is another purpose of the invention to conduct secure transactions at a SIP endpoint, with SIP endpoint inputs being selectively displayed and suppressed;

It is a purpose of the invention to transport control display information from a proxy or application to a Session Initiation Protocol (SIP) endpoint for selectively suppressing echoing input digits;

It is another purpose of the invention to indicate select within SIP based communication between a SIP server and SIP endpoints when SIP endpoints echo input digits;

It is yet another purpose of the invention to indicate select within SIP based communication between a SIP server and SIP endpoints whether or not to echo input digits at the SIP endpoints;

It is yet another purpose of the invention to indicate select within SIP based communication between a SIP server and SIP endpoints whether to echo input digits, substitute placekeeper digits or not echo input digits at the SIP endpoints.

The present invention relates to a method of managing a communications network, managing secure transactions conducted by digital communications devices over a communications network and computer program product therefore. A Back to Back User Agent (B2BUA), for example, receives numerical input from a networked digital communications device, e.g., a Session Initiation Protocol (SIP) device, and determines when and whether the SIP device displays digits entered at the devices. The B2BUA analyzes received digits for an identification (ID) code and selectively couples the SIP devices with a media server capable of providing prompting the SIP devices. In cooperation with the media server, the B2BUA directs replacing sensitive codes (e.g., passwords or Personal Identification Number (PIN)) with placekeepers or suppressing display altogether. After sensitive code input is complete, digit entry display resumes.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
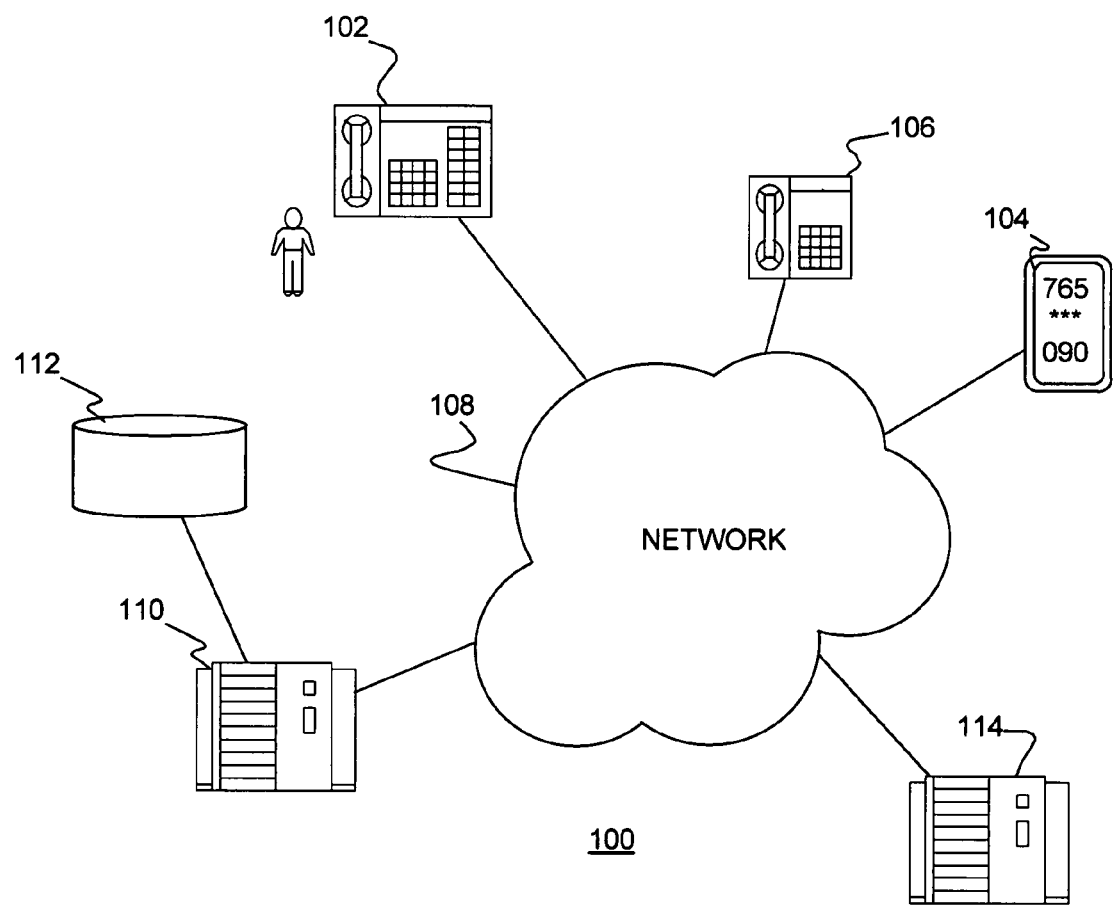
FIG. 1 shows an example of a preferred Session Initiation Protocol (SIP) based system that selects within SIP based communication between SIP server(s) and SIP endpoints whether to echo input digits, substitute placekeepers or not echo input digits at the SIP endpoints.

Turning now to the drawings and more particularly, FIG. 1 shows an example of a preferred Session Initiation Protocol (SIP) based system 100 that selects, within SIP based communication between SIP server(s) and SIP endpoints 102, 104, 106, whether locally to echo input digits, substitute placekeeper digits or not echo input digits at the SIP endpoints 102, 104, 106. Thus enhancing local display features improves end user experience and, in particular, provides transaction security that is unavailable prior to the present invention. It should be noted that although described herein with reference to SIP based communications, the present invention has application to any digital communications. So, the present invention has application to enhance Computer Supported Telecommunications Applications (CSTA) and user agent CSTA (uaCSTA) with the same extended display functionality and security.

Devices at SIP endpoint 102, 104, 106, e.g., keysets, may be connected over the network 108 to a Back to Back User Agent (B2BUA) 110 running a digit echo suppression application 112. The network 108 also may include one (or typically, more) appropriate SIP server(s) 114, for example, a media server, a presence server, a registrar server, a location server, a proxy server and/or a redirect server. The echo suppression application 112 monitors SIP endpoint connections and determines a particular point in any such connection (i.e., when the user at the SIP endpoint is inputting or being prompted to input digits), whether input digits may need to be displayed (e.g., an identification (ID) or destination code) or not be displayed, e.g., an authorization code, password or Personal Identification Number (PIN).

The network 108 may be, for example, a Local Area Network (LAN), a wireless LAN (w-LAN or wi-fi), or the Internet. The keysets 102, 104, 106 may be, for example, digital telephones and/or, soft phones, that are connected for voice communications, some of which may have multiple line appearances, e.g., a primary line, secondary lines and phantom lines. The preferred B2BUA 110 distributes calls by sending messages notifying of an incoming call to all appearances of a called number. Correspondingly, for each call, each SIP endpoint (keysets or other suitable SIP enabled devices 102, 104, 106) and server (e.g., gateway server 114) on the network 108 is responsible for establishing media and sending, accepting, and interpreting a call type and an originating network ID included in each notification message.

According to a preferred embodiment of the present invention, the application 112 in the B2BUA 110 provides a security SIP interface between the SIP server 114 and the SIP endpoints 102, 104, 106 managing whether and how numerical entries, e.g., digits, are echoed at the local device to the user. By selectively suppressing echoing digits, the B2BUA application 112 provides three basic display functions for SIP end points 102, 104, 106 that supply a previously unavailable basic security capability to the SIP endpoints 102, 104, 106. These three basic display functions include locally echoing (displaying) entered digits, such as is normally done at a SIP end point 102, 104, 106; completely suppressing echoing for one or more digits such that none of the entered digits display; and substituting a placekeeper character (e.g., "*") at the display for one or more entered digits.

Figure 2:
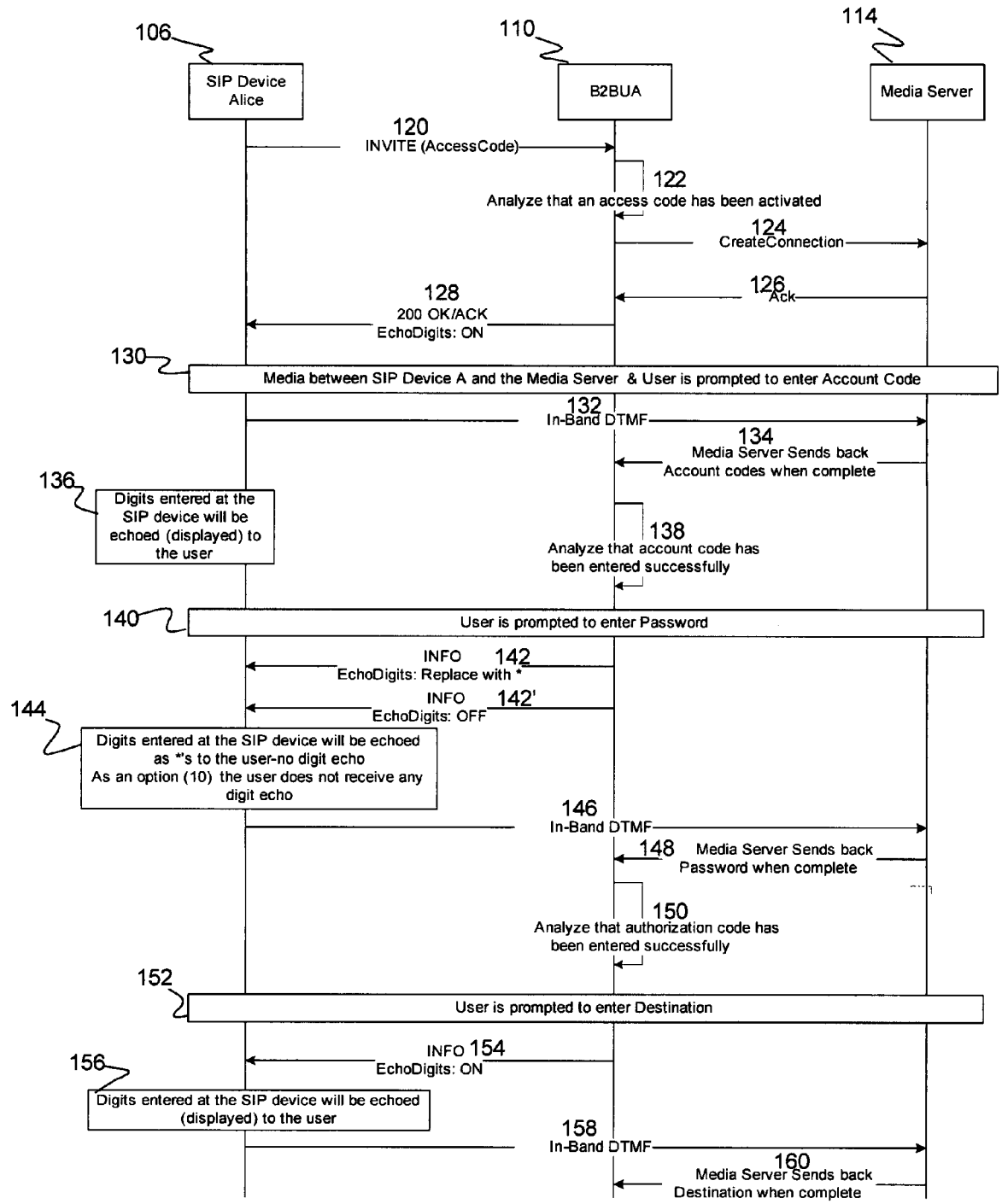
FIG. 2 shows an example of signaling for a secure transaction from a SIP endpoint wherein a user first at endpoint, for example, inputs an account code, followed by a password, followed by a destination.

FIG. 2 shows an example of signaling for a transaction, with reference to FIG. 1, wherein a user first at endpoint 106 inputs numerical codes that are selectively suppressed, for example, an account code, followed by a password, followed by a destination. During the transaction in this example, the numerical account code is displayed/echoed normally to the user, the numerical password digits are each replaced by a placekeeper character (e.g., "*") and the numerical destination is displayed/echoed normally. In this example, the application (112 in FIG. 1) resides in the B2BUA 110 and controls the media server 114, which plays prompts that inform users what is required for each transaction or each step in a transaction. Also, the B2BUA 110 maintains an awareness of the state of endpoint communications during the transaction, i.e., why a user is inputting digits, and based on the current input e.g., authorization code input, account code input, or a password. Based on this state the B2BUA 110 controls echoing digits, not echoing digits or substituting placekeepers at the SIP endpoint displays.

So in this example, a user at endpoint 106 begins account code input by initiating a SIP INVITE message 120 to B2BUA 110 that includes an access code. Since this is the initial dial state for the SIP endpoint 106, the SIP endpoint 106 echoes the access code digits normally to the SIP endpoint 106 display. The B2BUA 110 analyzes the access code digits 122 until it identifies that the digit input string is an access code indicating account code entry. The B2BUA 110 responds by connecting 124 the SIP endpoint 106 to the media server 114. The media server 114, which provides prompts/announcements to guide the endpoint user, returns a SIP ACK message 126 to the B2BUA 110. Once connected to the media server 114 the SIP endpoint 106 no longer echoes digits normally. However, the B2BUA 110 sends a Notify message to the SIP endpoint 106, a SIP 200 OK/ACK message 128, that indicates that input digits should be echoed in the display. At this point 130, the media is established between the SIP endpoint 106 and the media server 114, which prompts the endpoint user to enter an account code.

The numerical digit input from SIP endpoint 106 passes as in-band Dual-Tone-Multi-Frequency (DTMF) signals 132 to the media server 114. Once the media server 114 detects the complete account code, the media server 114 returns 134 the account code information to the B2BUA 110. The SIP endpoint 106 continue echoing 136 entered digits, while the B2BUA 110 analyzes 138 the account code. Once the B2BUA 110 identifies the account code, the B2BUA 110 requests that the media server 114 prompt 140 the user to enter a password at the SIP endpoint 106.

Since following the prompt 140, the current/immediately following digit information is a password, the password should not be displayed. So, the B2BUA 110 sends a SIP Notify message 142 to the SIP endpoint 106 indicating that each input digit should be replaced with a placekeeper, e.g., a SIP Notify message with "INFO" directing substitution with a "*" in echoed digits for display. Alternatively, the B2BUA 110 sends a SIP Notify message 142' to the SIP endpoint 106 indicating that input digits should not be echoed/displayed at the SIP endpoint 106. So, while the user enters the PIN/password 144 at the SIP endpoint 106, the digits are echoed as placekeepers only or not at all. Again, a PIN or password digit input from SIP endpoint 106 passes as in-band DTMF signals 146 to the media server 114. Once the media server 114 detects the last digit to complete the password or an end of string digit (e.g., "#"), the media server 114 returns 148 the password to the B2BUA 110. The B2BUA 110 analyzes 150 the password. If the B2BUA 110 confirms that the password is correct, the B2BUA 110 requests that the media server 114 prompt 152 the user to enter a destination and password entry is complete.

The media server 114 prompts 152 for the destination; and, echoing and displaying digits may resume at the SIP endpoint 106. So, the B2BUA 110 sends a SIP Notify message 154 to the SIP endpoint 106. The SIP Notify message 154 indicates that the SIP endpoint 106 should resume echoing input digits in the display again. With input digits echoed 156, the SIP endpoint 106 user views what is being input to the SIP endpoint 106. So once again, the user enters digits identifying the destination, with the input passing as in-band DTMF signals 158 from the SIP endpoint 106 to the media server 114. Thereafter, the media server 114 may pass control signals 160 for other features and functions through the B2BUA 110 to the SIP endpoint 106. Thus, a preferred SIP server 114/ B2BUA 110/digit echo suppression application 110 controls information display on SIP endpoints providing security as needed and a more user friendly experience.

Advantageously, the present invention enhances current SIP protocol to provide a mechanism wherein a SIP server/application controls SIP endpoint display information. More particularly, the SIP server can control what digits are echoed/displayed and selects when digits are not displayed at the SIP endpoint during input. Input display may be shown or suppressed with sensitive input replaced by placekeepers or totally suppressed. Further, the present invention is backward compatible with older SIP entities and enhances and improves user experience these older SIP entities, especially during calls involving interaction with a media server.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of managing a communications network, said method comprising the steps of:
   a) receiving a plurality of digits input from a networked digital device;
   b) analyzing said received digits for an identification (ID) code;
   c) coupling said networked digital device with a media server;
   d) prompting said networked digital device for a secure code;
   e) suppressing display of digits input from said networked digital device until said secure code is identified; and
   f) after said secure code is identified, resuming echoing digits input from said networked digital device.

2. The method of managing a communications network as in claim 1, wherein during the step (a) of receiving said plurality of digits, said networked digital device displays input digits being entered.

3. The method of managing a communications network as in claim 1, wherein said communications network comprises a Session Initiation Protocol (SIP) communications system, said networked digital device is a SIP device, said plurality of digits are received by a Back to Back User Agent (B2BUA) in step (a), and said B2BUA coupling said networked digital device with said media server in step (c).

4. The method of managing a communications network as in claim 3, wherein the step (c) of coupling said SIP device with said media server comprises establishing media between said SIP device and said media server, said media server passing voice prompts to said SIP device in step (d).

5. The method of managing a communications network as in claim 4, wherein the step (d) of prompting said SIP device further comprises prompting said SIP device for an account ID.

6. The method of managing a communications network as in claim 5, wherein the step (d) of prompting said SIP device and the step (e) of suppressing display of digits each comprises the steps of:
   i) passing said digits input from said networked digital device to said media server until a respective code is received;
   ii) forwarding said respective code to said B2BUA; and
   iii) verifying said forwarded respective code.

7. The method of managing a communications network as in claim 6, wherein before the step (e)(i) of passing said digits, the step (e) of suppressing display of digits further comprises instructing said networked digital device to echo placekeepers for each input digit.

8. The method of managing a communications network as in claim 6, wherein the step (f) of resuming echoing said digits comprises the steps of:
   i) prompting said SIP device for a destination;
   ii) signaling said SIP device to echo digits;
   iii) passing said digits input from said networked digital device to said media server until a secure destination code is received;
   iv) forwarding said secure destination code to said B2BUA; and
   v) verifying said forwarded destination code.

9. The method of managing a SIP communications system as in claim 8, wherein the steps (d)(i), (e)(i) and (f)(iii) of passing said digits each comprises passing said digits as in-band Dual-Tone-Multi-Frequency (DTMF) signals.

10. A method of conducting secure transactions in a Session Initiation Protocol (SIP) communications network, said method comprising the steps of:
    a) sending a plurality of digits input from a networked SIP device to a Back to Back User Agent (B2BUA), said networked SIP device displaying input digits being entered;
    b) analyzing received digits for an identification (ID) code, and after said ID code is identified;
    c) coupling said networked SIP device with a media server;
    d) sending prompts for an account code from said media server to said networked SIP device;
    e) sending a second plurality of digits input from said networked SIP device to said media server, said networked SIP device displaying input digits being entered;
    f) analyzing said received digits for said account code, and after said account code is identified;
    g) sending prompts from said media server to said networked SIP device, sent prompts prompting for a secure code;
    h) sending a third plurality of digits input from said networked SIP device to said media server, display of digits input from said networked SIP device being suppressed until said secure code is identified; and
    j) after said secure code is identified, resuming echoing digits input from said networked digital device.

11. The method of conducting secure transactions as in claim 10, wherein the step (c) of coupling said SIP device with said media server comprises establishing media between said SIP device and said media server, said media server passing voice prompts to said SIP device in step (d).

12. The method of conducting secure transactions as in claim 11, wherein the step (j) of resuming echoing said digits comprises the steps of:
    i) prompting said SIP device for a destination;
    ii) signaling said SIP device to echo digits;
    iii) passing said digits input from said networked digital device to said media server until a destination code is received;
    iv) forwarding said secure destination code to said B2BUA; and
    v) verifying said forwarded said destination code.

13. The method of conducting secure transactions as in claim 12, wherein the steps (e) and (h) of sending plurality of digits from said SIP device, each further comprises the steps of:
    i) passing said digits input from said networked digital device to said media server until a respective code is received;

ii) forwarding said respective code to said B2BUA; and
iii) verifying said forwarded said respective code.

14. The method of conducting secure transactions as in claim 13, wherein the step (e)(i), (h)(i) and (j)(i) of passing said digits each comprises passing said digits as in-band Dual-Tone-Multi-Frequency (DTMF) signals.

15. The method of conducting secure transactions as in claim 10, wherein suppressing display of digits further in step (h) comprises instructing said networked SIP device to echo placekeepers for each input digit.

16. A computer program product for managing secure transactions conducted by digital communications devices over a communications network, said computer program product comprising a non-transitory computer usable medium having computer readable program code stored thereon, said computer readable program code comprising:
 computer readable program code for receiving numerical input from a networked digital communications device;
 computer readable program code for analyzing received digits for an identification (ID) code;
 computer readable program code for coupling said networked digital communications device with a media server capable of providing prompts to coupled said networked digital communications device;
 computer readable program code for directing said networked digital communications device to suppress echoing input digits; and
 computer readable program code for directing said networked digital communications device to resume echoing digits input from said networked digital communications device.

17. The computer program product as in claim 16, wherein the computer readable program code for directing said networked digital device to suppress echoing comprises computer readable program code for instructing said networked digital communications device to display placekeepers for each input digit.

18. The computer program product as in claim 16, wherein said networked digital communications device is a Session Initiation Protocol (SIP) device and the computer readable program code for coupling said SIP device with said media server comprises computer readable program code for establishing media between said SIP device and said media server, said media server passing prompts for numerical codes to said SIP device and returning received numerical codes.

19. The computer program product as in claim 18, wherein said numerical codes comprise an account code, a password and a destination.

20. The computer program product as in claim 18, wherein the computer readable program code for coupling said networked digital device with said media server comprises computer readable program code for allowing said numerical codes to pass from said SIP devices to said media server as in-band Dual-Tone-Multi-Frequency (DTMF) signals.

* * * * *